United States Patent
Wu

(10) Patent No.: US 9,042,135 B2
(45) Date of Patent: May 26, 2015

(54) METHODS AND APPARATUSES FOR A SOFT-START FUNCTION WITH AUTO-DISABLE

(75) Inventor: Gary Chunshien Wu, San Diego, CA (US)

(73) Assignee: Peregrine Semiconductor Corporation, San Diego, CA (US)

(*) Notice: Subject to any disclaimer, the term of this patent is extended or adjusted under 35 U.S.C. 154(b) by 64 days.

(21) Appl. No.: 13/366,149

(22) Filed: Feb. 3, 2012

(65) Prior Publication Data

US 2013/0200873 A1  Aug. 8, 2013

(51) Int. Cl.
*H02M 1/00* (2006.01)
*H02M 3/156* (2006.01)
*H02M 3/335* (2006.01)
*H02M 1/36* (2007.01)
*H02M 1/32* (2007.01)

(52) U.S. Cl.
CPC ......... *H02M 3/156* (2013.01); *H02M 3/33507* (2013.01); *H02M 1/32* (2013.01); *H02M 1/36* (2013.01)

(58) Field of Classification Search
CPC ........................................................ G06F 1/46
USPC ............ 363/49, 117, 167; 323/238, 288, 321, 323/326, 370, 167, 222, 267, 282, 284, 271, 323/273, 274, 234, 286, 901
See application file for complete search history.

(56) References Cited

U.S. PATENT DOCUMENTS

| | | | |
|---|---|---|---|
| 6,169,433 B1* | 1/2001 | Farrenkopf | 327/131 |
| 6,175,223 B1* | 1/2001 | Martinez et al. | 323/274 |
| 6,452,425 B1* | 9/2002 | Gregorian et al. | 327/99 |
| 6,674,272 B2* | 1/2004 | Hwang | 323/284 |
| 7,400,121 B2* | 7/2008 | Martins | 323/274 |
| 7,498,792 B2* | 3/2009 | Chang et al. | 323/288 |
| 7,595,623 B2* | 9/2009 | Bennett | 323/288 |
| 2005/0105307 A1* | 5/2005 | Shearon et al. | 363/49 |
| 2008/0094048 A1* | 4/2008 | Basso et al. | 323/283 |
| 2009/0174385 A1* | 7/2009 | Yen et al. | 323/288 |
| 2011/0032038 A1* | 2/2011 | Shimamoto et al. | 330/297 |
| 2011/0204860 A1* | 8/2011 | Thiele et al. | 323/271 |

* cited by examiner

*Primary Examiner* — Gary L Laxton
*Assistant Examiner* — Trinh Dang
(74) *Attorney, Agent, or Firm* — Jaquez Land Richman LLP; Martin J. Jaquez, Esq.; Alessandro Steinfl, Esq.

(57) ABSTRACT

Methods and apparatuses for a soft-start function with auto-disable are described. Such methods and apparatuses can gradually increase a voltage towards a reference voltage using a ramp generator and a control loop and can disable the ramp generator and the control loop once the voltage has reached the reference voltage.

21 Claims, 4 Drawing Sheets

METHODS AND APPARATUSES FOR A SOFT-START FUNCTION WITH AUTO-DISABLE

FIELD

The present disclosure relates generally to electronic circuits. More particularly, the disclosure relates to methods and apparatuses for a soft-start function with auto-disable.

BACKGROUND

In electronic applications, improper start-up conditions for voltages and/or currents may damage circuit components. For instance, in electronic applications that make use of DC-DC voltage converters, improper start-up conditions can damage circuits powered by such DC-DC voltage converters and/or damage the DC-DC voltage converters themselves. Many circuits have a maximum limit on rate of supply voltage ramp-up, which dictates a maximum rate at which a supplied voltage powering the circuit can rise to a target level during a start-up phase. Similarly, many circuits have a maximum limit on voltage that can be applied. If the rate were to be higher than the maximum limit of a particular circuit, the voltage may overshoot and a particular circuit under consideration can be damaged.

SUMMARY

According to a first aspect, a circuital arrangement is provided, wherein the circuital arrangement is adapted to be coupled to a reference voltage generator, the reference voltage generator adapted to generate a reference voltage when not coupled to the circuital arrangement, the circuital arrangement comprising: a ramp generator, wherein, during operation, the ramp generator is configured to generate a ramp voltage that increases in magnitude over time; a control loop comprising a comparator coupled with a first switching element on one end and the ramp generator on another end, wherein, during operation: the comparator is configured to receive the ramp voltage and a soft-start voltage, the comparator is configured to apply a comparator output voltage to the first switching element, and the comparator output voltage gradually turns off the first switching element as the ramp voltage increases toward the reference voltage, wherein the soft-start voltage is a function of the ramp voltage, the comparator output voltage, and the reference voltage.

According to a second aspect, a method for increasing a soft-start voltage from a first voltage to a second voltage is provided, the second voltage being substantially equal in value to a reference voltage, wherein the reference voltage is adapted to be generated via a reference voltage generator, the method comprising: generating a ramp voltage via a ramp generator, wherein, during operation of the ramp generator, the ramp voltage increases in magnitude over time; providing a control loop, wherein the control loop comprises a comparator coupled with a first switching element on one end and the ramp generator on another end; generating a comparator output voltage via the comparator based on the ramp voltage and the soft-start voltage; providing the first switching element, wherein: the first switching element is adapted to receive the comparator output voltage, and the comparator output voltage gradually turns off the first switching element as the ramp voltage increases toward the reference voltage; providing the first voltage as the soft-start voltage; increasing the soft-start voltage toward the second voltage when the ramp voltage is less than the reference voltage; and retaining the soft-start voltage at the second voltage when the ramp voltage is greater than the reference voltage, thus increasing the soft-start voltage from the first voltage to the second voltage.

Further embodiments are provided in the specification, drawings, and claims of the present application.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

DETAILED DESCRIPTION

A "soft-start" circuit can be used to limit rate at which a voltage and/or current is output from the soft-start circuit. A soft-start circuit can be implemented with or as part of a DC-DC converter, where the soft-start circuit can be used to limit rate at which voltage of the DC-DC converter rises and/or rate of in-rush of current at start-up to circuits powered by the DC-DC converter. The rate at which voltage rises can be referred to as voltage ramp-up and similarly rate at which current rises can be referred to as current ramp-up.

According to many embodiments of the present disclosure, one or both of the voltage and current ramp-up can be controlled to allow a smooth transition from start-up to when the voltage or current output from the soft-start circuit reaches regulation. "Reaching regulation" refers to a state where a soft-start circuit has reached a target voltage or current (also referred to as a steady-state voltage or current).

Aside from DC-DC converters, soft-start circuits can be utilized in, for instance, a linear regulator such as a low-dropout regulator in order to control rate of voltage increase and prevent voltage overshoot. Other devices identifiable by a person skilled in the art can utilize the limitations on voltage ramp-up and/or current ramp-up that can be realized with soft-start circuits.

As used herein, the terms "switching device" and "switch" are used interchangeably and may refer to a device that can turn on or off in response to one or more control signals. The present disclosure can be built using various switching devices comprising one or more of microelectromechanical system (MEMS) switches, diodes, bipolar junction transistors, field effect transistors (e.g., metal-oxide-semiconductor field effect transistor (MOSFET)), and other switching devices identifiable by a person skilled in the art. As is well known, a switch can be configured to serve as digital switches, which are essentially fully on or fully off, but can also be configured to serve as analog switches with varying degrees of on or off. In the latter case, the switch can be considered off but still be conducting to some (generally small) degree (e.g., a transistor in subthreshold/cutoff mode).

In this regard, a switch can also be considered as a voltage-controlled resistor or a voltage-controlled current source.

Figure 1:
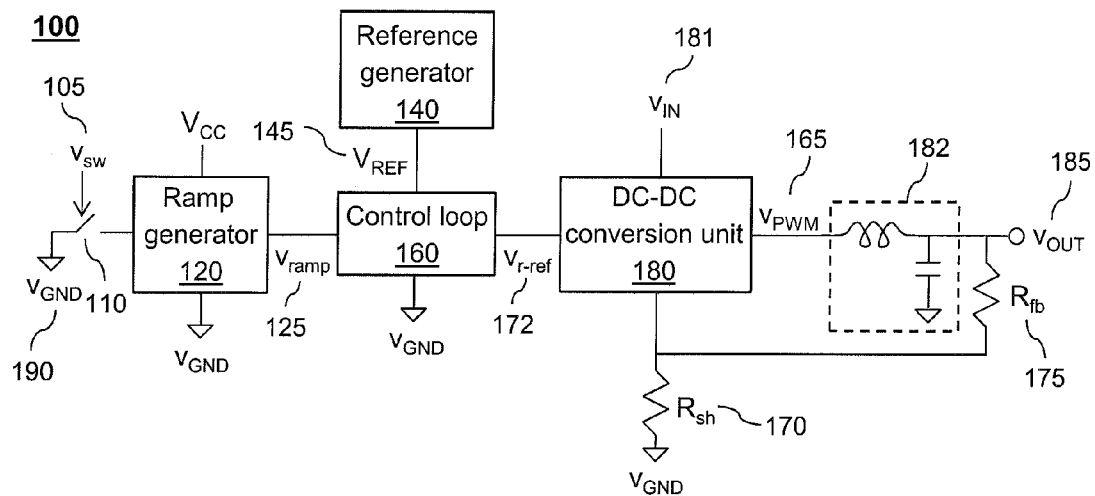
FIG. 1 shows a block diagram of a DC-DC converter that comprises a soft-start circuit.

FIG. 1 shows a block diagram of a DC-DC converter (100) that comprises a soft-start circuit. The soft-start circuit may comprise a ramp generator (120) and a control loop (160). The soft-start circuit may be configured to be connected with a switch (110), where the switch (110) can be open when the soft-start circuit is in operation mode or disable mode and can be closed when the soft-start circuit is in reset mode. The control loop (160) can be configured to generate a soft-start voltage $v_{r\text{-}ref}$ (172) by comparing a ramp voltage $v_{ramp}$ (125) output from the ramp generator (120) to a voltage reference $V_{REF}$ (145), where the voltage reference $V_{REF}$ (145) can be generated using a reference generator (140). The voltage reference $V_{REF}$ (145) can be internally generated.

Each of the operation, disable, and reset modes of the soft-start circuit will now be described in more detail. A switch voltage $v_{sw}$ (105), which is applied to a control terminal of the switch (110) (e.g., a gate of a field effect transistor), can determine whether the soft-start circuit is in operation mode and disable mode or in reset mode. The switch (110) can be connected to ground (190). The switch voltage $v_{sw}$ (105) is generally a digital signal that can be at a voltage $V_{DD}$, associated with a logic high state, or at a voltage $V_{SS}$ (e.g., 0 V), associated with a logic low state, where in general $|V_{DD}| > |V_{SS}|$. When the switch voltage $v_{sw}$ (105) is at $V_{DD}$, the switch (110) is generally closed (turned on) and the soft-start circuit is in reset mode, where the ramp voltage $v_{ramp}$ (125) transitions toward ground (190). In contrast, when the switch voltage $v_{sw}$ (105) is at $V_{SS}$, the switch (110) is generally open (turned off) and the soft-start circuit is in operation mode or disable mode, where the ramp voltage $v_{ramp}$ (125) transitions away from ground (190). As a result, the switch voltage $v_{sw}$ (105) can also be referred to as a reset voltage or reset signal.

Specifically, when in operation mode and disable mode, operation of the ramp generator (120) takes the ramp voltage $v_{ramp}$ (125) and gradually increases it from ground (190) (e.g., $v_{GND}$=0 V) toward a supply voltage $V_{CC}$ provided to the ramp generator (120). When in reset mode, operation of the ramp generator (120) takes the ramp voltage $v_{ramp}$ (125) and decreases it toward ground (190).

The DC-DC converter (100) can further comprise a DC-DC conversion unit (180) that can be connected with the control loop (160) and can be configured to generate a voltage $v_{PWM}$ (165) based on the soft-start voltage $v_{r\text{-}ref}$ (172) from the control loop (160). From the voltage $v_{PWM}$ (165), a substantially DC voltage $v_{OUT}$ (185) can be generated. The DC-DC conversion unit (180) can take as input a voltage $v_{IN}$ (181), which is a supply voltage that is sufficient for sustaining operation of the DC-DC conversion unit (180). The voltage $v_{PWM}$ (165) may be a function of the input voltage $v_{IN}$ (181). An example range of values for input voltage $v_{IN}$ (181) can be 5 V±10%.

The DC-DC conversion unit (180) can generate a voltage $v_{PWM}$ (165) based on comparing the soft-start voltage $v_{r\text{-}ref}$ (172) to a feedback voltage from a resistor $R_{fb}$ (175). By operating the control loop (160), the soft-start voltage $v_{r\text{-}ref}$ (172) is adapted to approach the reference voltage $V_{REF}$ (145), which can be internally generated (e.g., within the soft-start circuit). Operation of the control loop (160) for generation of the soft-start voltage $v_{r\text{-}ref}$ (172) will be discussed in more detail with reference to FIG. 3. An LC network (182) can be utilized to convert the voltage $v_{PWM}$ (165) to a DC-DC converter output voltage $v_{OUT}$ (185), which is an output of the DC-DC converter (100) shown in FIG. 1. Resistors $R_{sh}$ (170) and $R_{fb}$ (175) factor into voltage value of the DC-DC converter output voltage $v_{OUT}$ (185), which is given by the equation $v_{OUT}=V_{r\text{-}ref}(R_{fb}/R_{sh}+1)$. The DC-DC converter output voltage $v_{OUT}$ (185) can be a voltage supplied to circuits connected to the DC-DC converter (100).

As provided in FIG. 1, an equation for the soft-start voltage $v_{r\text{-}ref}$ (172) can be given by $v_{r\text{-}ref}=\min(V_{REF}, v_{ramp})$. Consequently, when $v_{ramp} < V_{REF}$, the control loop (160) outputs $v_{ramp}$. In contrast, when $V_{REF} < v_{ramp}$, the control loop (160) outputs $V_{REF}$.

With resistors $R_{sh}$ (170) and $R_{fb}$ (175) coupled with the control loop (160), an equation for the DC-DC converter output voltage $v_{OUT}$ (185) can be given by $v_{OUT}=\min(V_{REF}, v_{ramp})(R_{fb}/R_{sh}+1)$. Once the soft-start voltage $v_{r\text{-}ref}$ (172) has reached regulation, the soft-start voltage $v_{r\text{-}ref}$ (172) stays at $V_{REF}$, the DC-DC converter output voltage $v_{OUT}$ (185) can be given by $v_{OUT}=V_{REF}(R_{fb}/R_{sh}+1)$. Although in FIG. 1 the voltage $v_{OUT}$ (185) is a function of scaling due to values of the resistors $R_{sh}$ (170) and $R_{fb}$ (175), other components such as amplifiers can be provided to adjust/scale value of the voltage $v_{OUT}$ (185).

More specifically, with reference to FIG. 1, the DC-DC conversion unit (180) can output a square wave voltage $v_{PWM}$ (165) (e.g., pulse-width-modulated voltage) from which an output voltage $v_{OUT}$ (185) can be generated. For example, the DC-DC conversion unit (180) can be coupled to an LC network (182) that can comprise a series inductor and a shunt capacitor, where the LC network (182) can convert the square wave voltage $v_{PWM}$ (165) of a certain duty cycle to the output voltage $v_{OUT}$ (185) determined by the equation $v_{OUT}=\min(V_{REF}, v_{ramp})(R_{fb}/R_{sh}+1)$. A Buck converter is an example of such a configuration of the DC-DC conversion unit (180) and the LC network (182). The output voltage $v_{OUT}$ (185) of the DC-DC converter (100) is a function of the duty cycle of the square wave voltage $v_{PWM}$ (165), where duty cycle of the square wave voltage $v_{PWM}$ (165) can be a function of the input voltage $v_{IN}$ (181) and output voltage $v_{OUT}$ (185). The duty cycle can be given, for instance, by $v_{OUT}/v_{IN}$. The voltage $v_{OUT}$ (185) can be greater than, less than, or equal to the input voltage $v_{IN}$ (181).

It should be noted that the DC-DC conversion unit (180) can have internal control circuitry that can be configured to generate the square wave voltage $v_{PWM}$ (165) with a duty cycle $v_{OUT}/v_{IN}$ such that $v_{OUT}=\min(V_{REF}, v_{ramp})(R_{fb}/R_{sh}+1)$. The square wave voltage $v_{PWM}$ (165) can have a low value of 0 V and a high value of $v_{IN}$ (181).

During normal operation of circuits connected with a soft-start circuit, such as the DC-DC converter (100) of FIG. 1, the soft-start circuit is in disable mode (i.e., the soft-start circuit is disabled). With reference to FIG. 1, the soft-start circuit is disabled when the ramp voltage $V_{ramp}$ (125) exceeds the reference voltage $V_{REF}$ (145). The soft-start circuit is generally in operation mode only during a start-up phase of circuits connected with and/or otherwise powered by the soft-start circuit, such as the DC-DC converter (100) of FIG. 1. Reset mode of the soft-start circuit can be re-initiated when a global shutdown signal is asserted on the circuits connected with the soft-start circuit (e.g., the DC-DC converter (100) is turned off by a user). When the circuits come out of shutdown (e.g., shutdown signal de-asserts), the soft-start circuit enters operation mode until the ramp voltage $v_{ramp}$ (125) exceeds the reference voltage $V_{REF}$ (145), at which point the soft-start circuit enters disable mode.

Although shown as separate components, the components shown in FIG. 1 can be integrated onto one or more common chips. For instance, the ramp generator (120) and the reference generator (140) can be integrated on one chip. Furthermore, the DC-DC conversion unit (180) can comprise other step-down converters aside from the Buck converter described above, step-up/boost converters, as well as other voltage or current converting arrangements identifiable by a person skilled in the art.

Figure 2:
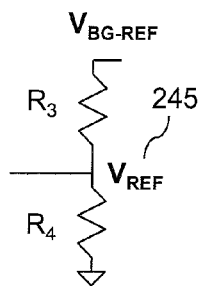
FIG. 2 shows an exemplary reference voltage generator that can be adapted for use with a soft-start circuit.

FIG. 2 shows a reference voltage generator (240) that is configured to generate a reference voltage $V_{REF}$ (245), such as the reference voltage $V_{REF}$ (145) shown in FIG. 1. Specifically, the reference voltage generator (240) can be connected to a soft-start circuit, as will be discussed in FIG. 3, such that a soft-start voltage $v_{r-ref}$ (372 in FIG. 3) of the soft-start circuit (300 in FIG. 3) can ramp-up toward the reference voltage $V_{REF}$ (245 in FIG. 2) when the soft-start circuit (300 in FIG. 3) is operating in operation mode and can stay at the reference voltage $V_{REF}$ (245 in FIG. 2) when the soft-start circuit (300 in FIG. 3) is operating in disable mode.

An exemplary method to generate a voltage reference is through an internal bandgap voltage reference. A bandgap voltage reference is a temperature independent voltage reference circuit that can be used to output a constant voltage $V_{BG-REF}$. An exemplary voltage output by the bandgap voltage reference is 1.25 V.

An exemplary voltage for the reference voltage $V_{REF}$ (245) is 1 V. To obtain a $V_{REF}$ (245) of 1 V from $V_{BG-REF}$, a voltage divider can be used. With reference to FIG. 2, a voltage division equation can be written as $V_{REF}=V_{BG-REF}\times[R_4/(R_3+R_4)]$, which yields that any combination of resistors with a ratio $R_4/(R_3+R_4)=4/5$ can be used to generate $V_{REF}$ of 1 V from $V_{BG-REF}$ of 1.25 V.

Figure 3:
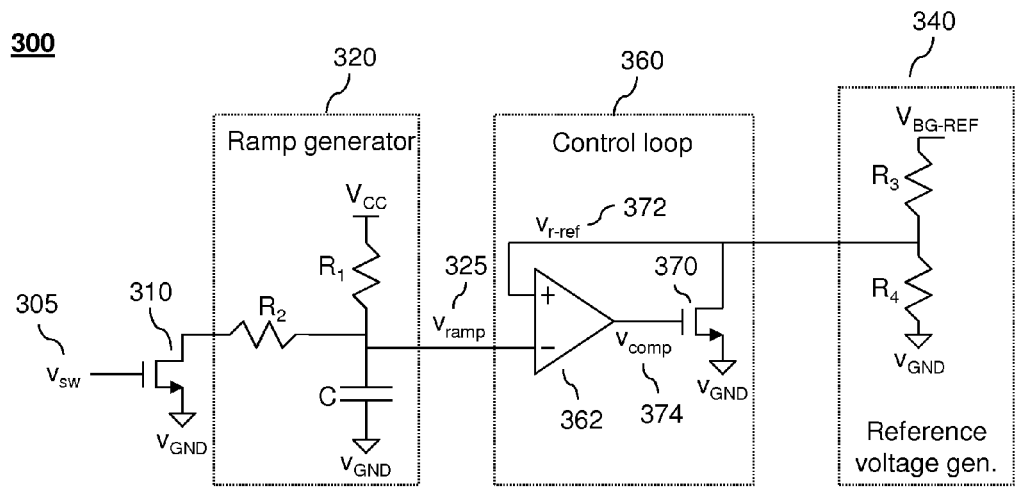
FIG. 3 shows an embodiment of a soft-start circuit.

FIG. 3 shows an embodiment of a soft-start circuit (300). As previously shown in FIG. 1, but now shown with reference to FIG. 3, the soft-start circuit (300) may comprise a ramp generator (320) and a control loop (360). Furthermore, the soft-start circuit (300) can be connected with a switch (310) and can be coupled with a reference voltage generator (340), such as the reference voltage generator (240) shown in FIG. 2. A switch voltage $v_{sw}$ (305) applied to the switch (310) (shown as a transistor) can close or open the switch (310).

Figure 4:
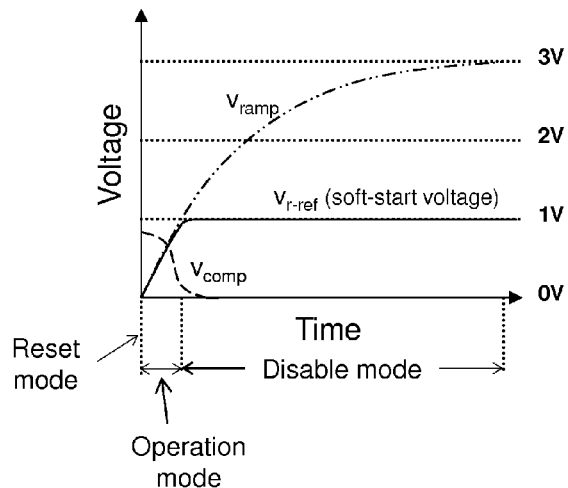
FIG. 4 shows a plot of voltage versus time for voltages associated with a soft-start circuit.

FIG. 3 is discussed in conjunction with FIG. 4, which shows a plot of voltage versus time for the ramp voltage $v_{ramp}$ (325), soft-start voltage $v_{r-ref}$ (372) measured across a drain of a transistor switch (370), and comparator voltage $v_{comp}$ (374) output from a comparator (362). For purposes of discussion, the transistor switch (370) can comprise an NMOSFET, although other switching devices (e.g., diodes, bipolar junction transistors, and so forth) can be utilized.

Similar to that previously described in FIG. 1, when the switch voltage $v_{sw}$ (305) is at a logic high state, the switch (310) can be closed and the soft-start circuit (300) is in reset mode. When the switch voltage $v_{sw}$ (305) is at a logic low state, the switch (310) can be open and the soft-start circuit (300) is in operation mode or disable mode. For FIG. 3, in reset mode, the ramp voltage $v_{ramp}$ (325) is driven toward $v_{GND}$ (ground). In operation mode and disable mode, the ramp voltage $v_{ramp}$ (325) is ramped up towards supply voltage $V_{CC}$.

Consider that the switch voltage $v_{sw}$ (305) is at a high logic state and thus the soft-start circuit (300) is in reset mode. For purposes of discussion, the ramp generator (320) can be assumed to be an RC ramp generator (320). The switch (310) is closed (turned on) and a voltage across capacitor C, referred to as a ramp voltage $v_{ramp}$ (325), is discharged toward ground through resistor $R_2$. When the switch voltage $v_{sw}$ (305) is in a low logic state and thus the soft-start circuit (300) is in operation mode or disable mode, the ramp voltage $v_{ramp}$ (325) increases due to current flow from the $V_{CC}$ supply through resistor $R_1$ and charging of the capacitor C via the current flow. In cases where resistance of resistor $R_2$ is lower than resistance of resistor $R_1$, transition time of the ramp voltage $v_{ramp}$ (325) toward ground is faster than transition time of the ramp voltage $v_{ramp}$ (325) from ground toward $V_{CC}$. It should be noted that resistor $R_2$ can limit maximum current during discharge to improve reliability of the soft-start circuit (300). Current that is too high may exceed an elecromigration limit that metal routing in the soft-start circuit (300) can support.

Although the ramp generator (320) may comprise an RC ramp generator, as depicted in FIG. 3, the ramp generator (320) may also be implemented with other ramps such as a linear voltage ramp. In such a case, during a charging cycle of the linear voltage ramp, voltage across a capacitor may increase linearly with time as a fixed current source feeds a constant current into a capacitor. For instance, resistor $R_1$ shown in FIG. 3 may be tied to or replaced with a current source to form a ramp generator. Voltage accumulated by the capacitor can then be discharged in a discharging cycle. Other ramp generators may be utilized depending on particular application and design specification.

With reference to FIGS. 3 and 4, FIG. 4 shows the ramp voltage $v_{ramp}$ (325) when the soft-start circuit (300) of FIG. 3 is in three different modes of operation: reset mode, operation mode, and disable mode. In reset mode, the ramp voltage $v_{ramp}$ (325) and the soft-start voltage $v_{r-ref}$ (372) is at ground or driven toward ground. When the switch voltage $v_{sw}$ (305) transitions from high to low, the soft-start circuit (300) enters operation mode, where the ramp voltage $V_{ramp}$ (325) is increasing from ground toward the reference voltage $V_{REF}$ while the soft-start voltage $v_{r-ref}$ (372) follows the ramp voltage $v_{ramp}$ (325). Once the ramp voltage $v_{ramp}$ (325) reaches the reference voltage $V_{REF}$, the soft-start circuit (300) enters disable mode, where the ramp voltage $v_{ramp}$ (325) can continue to increase toward $V_{CC}$ while the soft-start voltage $v_{r-ref}$ (372) is maintained at the reference voltage $V_{REF}$. Example values of $V_{REF}$ and $V_{CC}$ are 1 V and 3 V, respectively, as shown in FIG. 4.

Rate of increase of voltage is a function of a time constant $\tau=RC$ associated with the ramp generator (320). Example time constants associated with the ramp generator (320) are 24 μs (e.g., 1.6 MΩ×15 pF) and 0.16 s (e.g., 1.6 MΩ×0.1 μF). Time constants associated with the ramp generator (320) can vary and depend on particular applications/systems within which the ramp generator (320) is utilized. An example value of $V_{CC}$ is 3 V.

The ramp voltage $v_{ramp}$ (325) can be applied as an input into an inverting terminal of a comparator (362). The soft-start voltage $v_{r-ref}$ (372) tied to a drain of the transistor switch (370) can be applied as an input into a noninverting terminal of the comparator (362). The comparator output voltage $v_{comp}$ (374) takes the voltage inputs $v_{ramp}$ (325) and $v_{r-ref}$ (372) and outputs $v_{comp}=A(v_{r-ref}-v_{ramp})$, where A is an open-loop gain (can be greater than 60 dB) of the comparator (362). The comparator output voltage $v_{comp}$ (374) can be applied to a control node (e.g., gate) of the transistor switch (370).

With reference to voltages shown in FIG. 4, the comparator (362) initially sets the soft-start voltage $v_{r-ref}$ (372) close to the ramp voltage $v_{ramp}$ (325). As the ramp voltage $v_{ramp}$ (325) approaches $V_{REF}$, the comparator (362) gradually disables (turns off) the transistor switch (370) since the comparator output voltage $V_{ramp}$ (374) brings the transistor switch (370) into subthreshold region and the soft-start circuit (300) into disable mode. Consequently, as the ramp voltage $v_{ramp}$ (325) approaches $V_{REF}$, the soft-start voltage $v_{r-ref}$ (372) stops following $v_{ramp}$ (325), which can continue to increase until the soft-start circuit (300) goes into reset mode (or $V_{CC}$ has been reached), and the comparator output $v_{comp}$ (374) decreases toward 0 V.

By the time the ramp voltage $v_{ramp}$ (325) has increased to $V_{REF}$, the transistor switch (370) has turned off (with its gate voltage either at 0 V or otherwise smaller in magnitude than threshold voltage $V_T$ of the transistor switch (370)). Once the comparator output voltage $v_{comp}$ (374) has decreased sufficiently close to 0 V such that the transistor switch (370) is in a subthreshold region and thus conducts little (if any) current, the soft-start voltage $v_{r\text{-}ref}$ (372) has reached steady-state of around $V_{REF}$. At this point, the soft-start circuit (300) has been disabled (i.e., has entered disable mode). It should be noted that, although 0 V is utilized as a reference ground voltage $V_{GND}$, other ground voltages can be utilized.

FIG. 4 illustrates these characteristics of $v_{r\text{-}ref}$ (372 in FIG. 3) and $v_{comp}$ (374 in FIG. 3), where $V_{REF}$ and $V_{CC}$ are 1 V and 3 V, respectively. As a result, the soft-start voltage $v_{r\text{-}ref}$ (372 in FIG. 3) can also be referred to as a ramp-up reference voltage since it ramps-up from ground toward the reference voltage $V_{REF}$. An equation for the soft-start voltage $v_{r\text{-}ref}$ (372 in FIG. 3) can be given by $v_{r\text{-}ref}=\min(v_{ramp}, V_{REF})$, where the control loop (360 in FIG. 3) can supply the ramp voltage $v_{ramp}$ (325) (i.e., $v_{r\text{-}ref}=v_{ramp}$) when $v_{ramp}<V_{REF}$ and can supply the reference voltage $V_{REF}$ (i.e., $v_{r\text{-}ref}=V_{REF}$) when $v_{ramp}>V_{REF}$. When the soft-start circuit (300) is in disable mode after reaching regulation, the soft-start voltage $V_{r\text{-}ref}$ (372 in FIG. 3) is maintained at around $V_{REF}$.

When $v_{ramp}<V_{REF}$, the comparator output voltage $v_{comp}$ (374) is positive and of a value such that the transistor switch (370), which is depicted as an NMOSFET in FIG. 3, is enabled (turned on). While the transistor switch (370) is turned on, the soft-start circuit (300) is in operation mode and the soft-start voltage $v_{r\text{-}ref}$ (372) follows the ramp voltage $v_{ramp}$ (325). The comparator output voltage $v_{comp}$ (374) can be fed into the noninverting terminal of the comparator (362) through the transistor switch (370) as the soft-start voltage $v_{r\text{-}ref}$ (372), thus forming a feedback loop. As a result of the feedback loop, the comparator output voltage $v_{comp}$ (374) settles to a voltage such that $v_{r\text{-}ref}=v_{ramp}$ and maintains $v_{r\text{-}ref}=v_{ramp}$ until $v_{ramp}>V_{REF}$, at which point $V_{r\text{-}ref}=V_{REF}$.

When $v_{ramp}>V_{REF}$, the comparator output voltage $v_{comp}$ (374) is sufficiently low such that the transistor switch (370) is disabled (turned off) and thus the soft-start circuit (300) is in disable mode. Specifically, the transistor switch (370) gradually turns off (e.g., enters into cutoff mode or subthreshold region in the case of a FET) once $V_{ramp}$ exceeds $V_{REF}$. In this case, the soft-start voltage $v_{r\text{-}ref}$ (372) follows the reference voltage $V_{REF}$. As a result and as previously mentioned, the soft-start voltage $v_{r\text{-}ref}$ (372) can be referred to as a ramp-up reference voltage since $v_{r\text{-}ref}$ (372) gradually increases from ground voltage toward the reference voltage $V_{REF}$. Rate at which $v_{r\text{-}ref}$ (372) increases from ground voltage toward $V_{REF}$ is a function of a time constant $\tau=R_1 C$. The reference voltage $V_{REF}$ can be generated using a reference generator (240) such as that described in FIG. 2. Once the soft-start voltage $v_{r\text{-}ref}$ (372) has reached $V_{REF}$, the increasing of $v_{ramp}$ (325) towards $V_{CC}$ does not significantly affect value of $v_{r\text{-}ref}$ (372).

Gradual (voltage) changes are a function of ramp-up time of the ramp generator (320). It should be noted that time for gradual (voltage) changes, as referred to in "gradually turning off" (e.g., gradually transitioning into subthreshold region) and "gradually turning on" the transistor switch (370) and gradually increasing of the soft-start circuit $v_{r\text{-}ref}$ (372) from ground voltage toward $V_{REF}$, can be adjusted by utilizing one or more external soft-start resistances and/or capacitances (not shown).

Specifically, resistances and capacitances within the ramp generator (320) are generally fixed, and thus external resistances and/or capacitances can be connected with the ramp generator (320) to adjust an RC constant associated with the ramp generator (320). For example, an external soft-start capacitance can be disposed in parallel with capacitor C of the ramp generator (320) and can affect an RC constant associated with the ramp generator (320), thus affecting ramp-up time of the ramp generator (320). Actual capacitance value of the external soft-start capacitance can be selected based on desired ramp-up time. Gradual increase of the soft-start voltage $v_{r\text{-}ref}$ (372) can vary depending on design specification and application of the soft-start circuit (300), and an example range of time involved in such gradual increase can be in the tens of microseconds to hundreds of milliseconds.

As described in relation to FIGS. 1 and 3 and depicted in FIG. 4, a soft-start voltage $v_{r\text{-}ref}$ (172 in FIG. 1, 372 in FIG. 3) output from the soft-start circuit (300 in FIG. 3) can be gradually increased from ground voltage toward a reference voltage $V_{REF}$. An output voltage $V_{OUT}$ (185 in FIG. 1) of a DC-DC converter (100 in FIG. 1) can be scaled from the soft-start voltage $v_{r\text{-}ref}$ (172 in FIG. 1) and thus can also be gradually increased from ground voltage toward $K \times V_{REF}$, where K may a scaling factor associated with components such as voltage dividers and/or amplifiers. Without the soft-start circuit (300 in FIG. 3), the voltages $v_{r\text{-}ref}$ (172 in FIG. 1) and $v_{OUT}$ (185 in FIG. 1) can ramp up abruptly and damage circuitry of systems powered by the DC-DC converter (100 in FIG. 1).

With reference back to FIG. 3, as the output voltage $v_{r\text{-}ref}$ (372) reaches its steady-state value of $V_{REF}$ and the ramp voltage $v_{ramp}$ (325) exceeds $V_{REF}$, the transistor switch (370) gradually turns off and the soft-start circuit (300) enters disable mode, as described previously. This turning off of the transistor switch (370) turns off (disables) the control loop (360) and keeps the output voltage $v_{r\text{-}ref}$ (325) of the soft-start circuit (300) at $v_{r\text{-}ref}=V_{REF}$. Since this turning off of the transistor switch (370) occurs automatically as a result of operation of the soft-start circuit (300), it can be referred to as an auto-disable function of the soft-start circuit (300).

Specifically, once the transistor (370) has been turned off, which generally occurs after the ramp voltage $v_{ramp}$ (325) exceeds the reference voltage $V_{REF}$, the voltage $v_{r\text{-}ref}=V_{REF}$ can be used by the DC-DC conversion unit (180 in FIG. 1) to generate a square wave voltage $v_{PWM}$ (165 in FIG. 1) with a duty cycle $v_{OUT}/v_{IN}$, which would in turn generate the DC-DC converter output voltage $v_{OUT}$ (185 in FIG. 1). Operation of components (320, 360) shown in FIG. 3 should no longer affect value of the voltage $v_{r\text{-}ref}=V_{REF}$.

Figure 5:
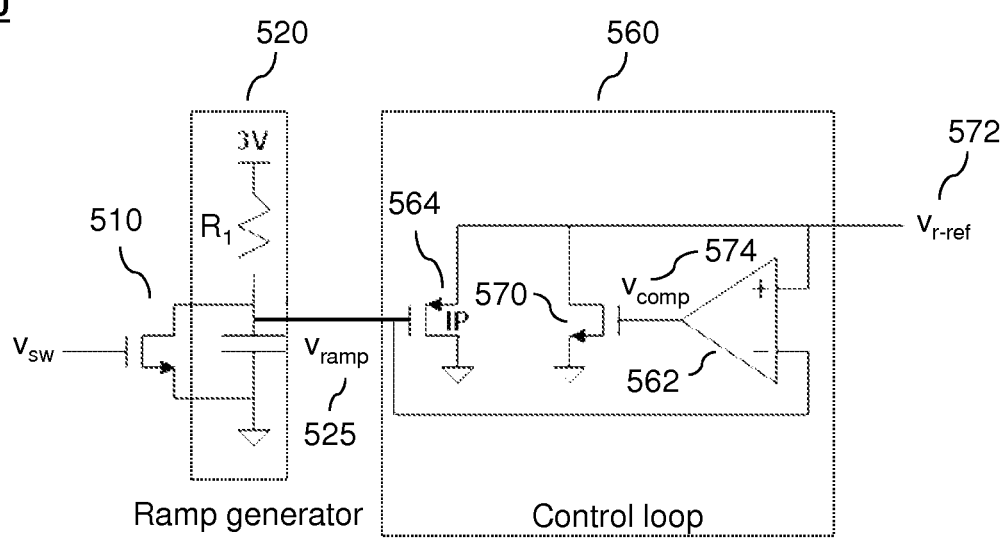
FIG. 5 shows another embodiment of a soft-start circuit.

FIG. 5 shows another embodiment of a soft-start circuit (500). Specifically, according to this embodiment, the soft-start circuit (500) may comprise a switch (510), a ramp generator (520), and a control loop (560) that can comprise an intrinsic PMOSFET (IP) source follower (564), a comparator (562), and a transistor switch (570). The intrinsic PMOSFET (IP) source follower (564) may refer to a PMOSFET with a threshold voltage $V_T$ anywhere between −0.2 V to +0.2 V. It should be noted that resistor $R_2$ shown in FIG. 3 can also be part of the ramp generator (520) and connected with the switch (510).

Operation of the soft-start circuit (500) shown in FIG. 5 is similar to the soft-start circuit (300) shown in FIG. 3, and voltages $v_{ramp}$ (525) and $v_{r\text{-}ref}$ (572) are similar to those shown in FIG. 4. Specifically, as previously described, when the switch (510) is closed (turned on), the soft-start circuit (500) is in reset mode and when the switch (510) is open (turned off), the soft-start circuit (500) is in either operation mode or disable mode. As in FIG. 3, the soft start circuit (500) of FIG. 5 can be connected with a reference voltage generator (240) such as that shown in FIG. 2.

In operation mode and disable mode, ramp voltage $v_{ramp}$ (525) is ramped up from ground towards a supply voltage $V_{CC}$ (shown as 3 V in FIG. 5). The ramp voltage $v_{ramp}$ (525) can be applied to an inverting terminal of the comparator (562) while an output voltage $v_{r\text{-}ref}$ (572) of the soft-start circuit (500) can be applied to a noninverting terminal of the comparator (562). A comparator output $v_{comp}$ (574) can be applied to a control node (e.g., gate) of the transistor switch (570). The transistor switch (570) is gradually turned off as the ramp voltage $v_{ramp}$ (525), and thus the output voltage $v_{r\text{-}ref}$ (572) of the soft-start circuit (500) approaches a reference voltage $V_{REF}$ (not shown in FIG. 5). The output voltage $v_{r\text{-}ref}$ (572) of the soft-start circuit (500) follows the ramp voltage $v_{ramp}$ (525) until $v_{ramp}$ exceeds $V_{REF}$, at which point the comparator (562) gradually disables (turns off) the transistor switch (570). In disabled mode, the output voltage $v_{r\text{-}ref}$ (572) of the soft-start circuit (500) has reached a steady-state voltage of $v_{r\text{-}ref}=V_{REF}$.

When the IP source follower (564) operates in saturation mode, source voltage of the IP source follower (564) follows voltage of gate voltage but by a fixed voltage offset determined by $V_T$ of the IP source follower (564). The IP source follower (564) gradually disables when the ramp voltage $v_{ramp}$ (525) approaches the reference voltage $V_{REF}$ and generally has completely disabled when the ramp voltage $v_{ramp}$ (525) exceeds $V_{REF}$. When $v_{ramp}$ (525) has exceeded $V_{REF}$, the soft-start circuit (500) is operating in disabled mode, as previously discussed.

Alternatively, the soft-start circuit (500) can comprise the switch (510), the ramp generator (520), and the IP source follower (564) and without the transistor switch (570) and the comparator (562). The soft-start voltage $v_{r\text{-}ref}$ (572) can follow the ramp voltage $v_{ramp}$ (525) but with an offset given by $V_{GS}$ of the IP source follower (564).

Figure 6:
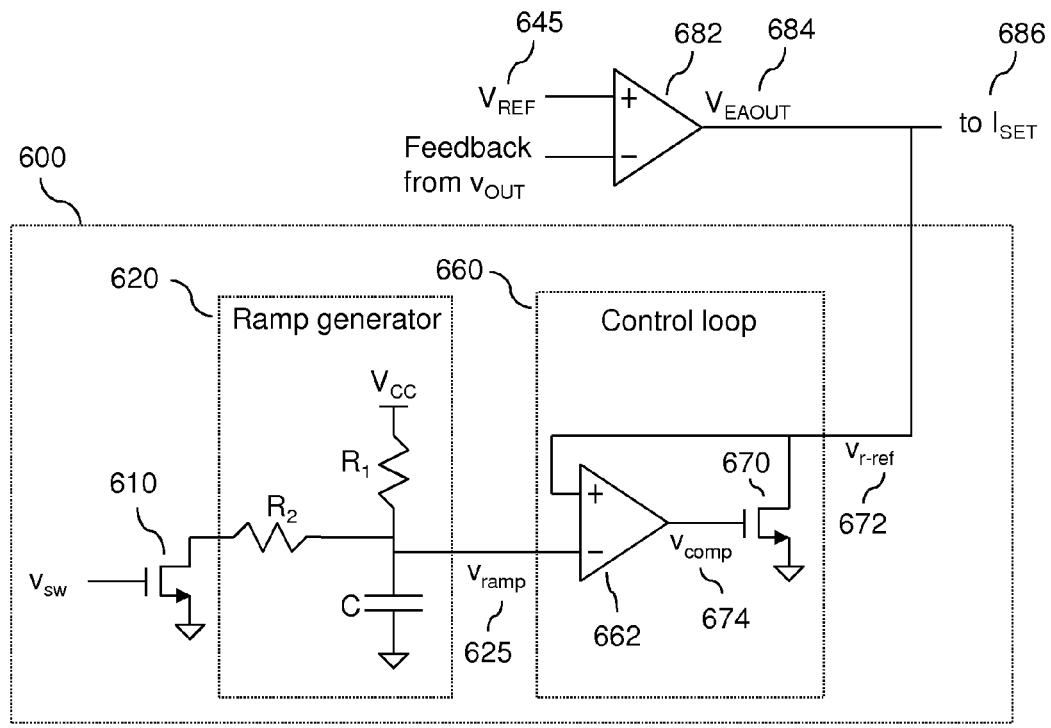
FIG. 6 shows an embodiment of a soft-start circuit that may be configured to control current level.

FIG. 6 shows a current-mode soft-start circuit that can be configured to control current level (e.g., current ramp up), also referred to as a current-mode DC-DC control. The current-mode soft-start circuit can comprise a voltage soft-start circuit (600) whose output voltage can be configured to control current level. The voltage soft-start circuit (600) may comprise a switch (610), a ramp generator (620), a control loop (660), and an operational transconductance amplifier (OTA) (682). The control loop (660) can comprise a comparator (662) and a transistor switch (670).

Whereas the control loop (660) can control rate at which an output voltage $v_{r\text{-}ref}$ (672) of the soft-start circuit (600) approaches a reference voltage, an output voltage $V_{EAOUT}$ (684) of the OTA (682), which is supplied to a terminal denoted as $I_{SET}$ (686), can control maximum current level that a system (e.g., DC-DC converter) connected with the voltage soft-start circuit (600) can provide. Specifically, the terminal $I_{SET}$ (686) can contain devices that can map the output voltage $V_{EAOUT}$ (684) to an output current $I_{OUT}$ (not shown).

The OTA (682) takes as input a reference voltage $V_{REF}$ (645) and a voltage feedback. With reference to FIG. 1, DC-DC converter output voltage $V_{OUT}$ (185) and resistive divider output $R_{sh}$ and $R_{fb}$ (170, 175) can provide the voltage feedback. The voltage soft-start circuit (600) can control ramp-up of the soft-start voltage $v_{r\text{-}ref}$ (672) and can control output voltage $v_{comp}$ (674) of the comparator (662). By connecting the voltage soft-start circuit (600) to the OTA (682), the output voltage $V_{EAOUT}$ (684) of the OTA (682) can be limited to a maximum voltage of no more than $v_{ramp}$ (625). A smooth start-up can be achieved where both voltage and current are controlled.

Figure 7:
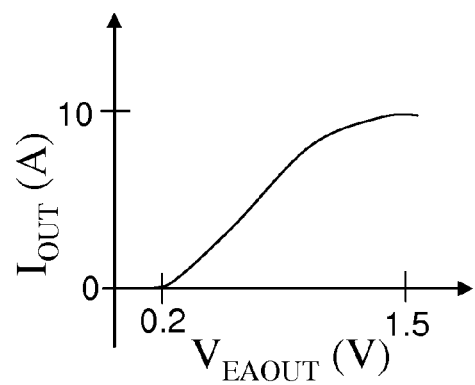
FIG. 7 shows an example mapping from voltage to current.

FIG. 7 shows an example mapping between a voltage $V_{EAOUT}$ (684 in FIG. 6) and an output current $I_{OUT}$ (not shown in FIG. 6) set at the terminal $I_{SET}$ (686 in FIG. 6). In the example of FIG. 7, current $I_{OUT}$ is between 0 A (when $0 V \leq V_{EAOUT} \leq 0.2$ V) and 10 A (when $V_{EAOUT}=1.5$ V). When connected with a circuit such as the DC-DC converter (100 in FIG. 1), the soft-start circuit (600 in FIG. 6) can limit (clamp) maximum current to 10 A, which in turn limits (clamps) the voltage $V_{EAOUT}$ (684 in FIG. 6). Other mappings between voltage $V_{EAOUT}$ and current $I_{OUT}$ can be used.

It should be noted that a particular embodiment of a soft-start circuit selected for use in any application depends on design specifications and applications. For instance, limiting current during start-up may be desirable in some systems whereas such limiting of current may be undesirable in other systems.

Furthermore, it should be noted that although soft-start voltage $v_{r\text{-}ref}$ (172 in FIG. 1) has been set such that $v_{r\text{-}ref}=V_{REF}$ in steady-state, value of the soft-start voltage $v_{r\text{-}ref}$ (172 in FIG. 1) may not be exactly equal to value of the reference voltage $V_{REF}$ due to parasitic effects (such as leakage currents from parasitic capacitances of switches). Soft-start circuits according to the embodiments of the present disclosure can be designed such that the soft-start voltage $v_{r\text{-}ref}$ (172 in FIG. 1) is close to $V_{REF}$ in steady-state. With reference to the soft-start circuit (300) of FIG. 3, proximity of the soft-start voltage $v_{r\text{-}ref}$ to $V_{REF}$ in steady-state is generally dependent on transistor switch (370). Specifically, current ratio between a leakage current of the transistor switch (370) in cutoff mode and a current through resistor $R_4$ can provide a metric for closeness between $v_{r\text{-}ref}$ and $V_{REF}$ in steady-state. Assuming $V_{REF}=1$ V, $R_4=4$ k$\Omega$, and leakage current of transistor switch (370) is 1 nA, the current ratio would be 1 nA/(1 V/400 k$\Omega$)=0.04%. A smaller current ratio is associated with a $v_{r\text{-}ref}$ that is closer to $V_{REF}$ in steady-state.

The examples set forth above are provided to give those of ordinary skill in the art a complete disclosure and description of how to make and use the embodiments of the methods and apparatuses for a soft-start function with auto-disable of the disclosure, and are not intended to limit the scope of what the inventor regard as his disclosure. Modifications of the above-described modes for carrying out the disclosure may be used by persons of skill in the art, and are intended to be within the scope of the following claims.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a", "an", and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

A number of embodiments of the disclosure have been described. Nevertheless, it will be understood that various modifications may be made without departing from the spirit and scope of the present disclosure. Accordingly, other embodiments are within the scope of the following claims.

The invention claimed is:

1. A circuital arrangement adapted to generate a soft-start voltage, wherein the circuital arrangement is adapted to be coupled to a reference voltage generator, the reference voltage generator being adapted to generate a reference voltage at a reference voltage terminal when not coupled to the circuital arrangement, the circuital arrangement comprising:
   a ramp generator, wherein, during operation, the ramp generator is configured to generate a ramp voltage that increases in magnitude over time;
   a control loop comprising:
      a comparator comprising at least a first input terminal, a second input terminal, and a first output terminal, and
      a first switching element comprising at least a first terminal and a second terminal, wherein:

the first input terminal of the comparator is tied to the second terminal of the first switching element and to the reference voltage terminal, the second input terminal of the comparator is tied to the ramp generator, and the first output terminal of the comparator is tied to the first terminal of the first switching element, wherein, during operation of the control loop:

the second input terminal of the comparator is adapted to receive the ramp voltage, the first output terminal of the comparator is configured to apply a comparator output voltage to the first terminal of the first switching element, the first switching element gradually goes from an ON condition to an OFF condition as a consequence of the comparator output voltage as the ramp voltage increases toward the reference voltage, and a current flow from the reference voltage generator through the switching element generates a soft-start voltage at the second terminal of the switching element, wherein the soft-start voltage is a function of the ramp voltage, the comparator output voltage, and the reference voltage.

2. The circuital arrangement according to claim 1, wherein:
the soft-start voltage follows the ramp voltage when the ramp voltage is less than the reference voltage, and
the soft-start voltage follows the reference voltage when the ramp voltage is greater than the reference voltage.

3. The circuital arrangement according to claim 1, wherein:
the first switching element is a field effect transistor, and
the first switching element is outside of subthreshold mode when the ramp voltage is not greater than the reference voltage and is in subthreshold mode when the ramp voltage is greater than the reference voltage.

4. The circuital arrangement according to claim 1, further comprising:
a PMOSFET coupled with the first switching arrangement and the comparator on one end and the ramp generator on another end,
wherein:
the PMOSFET is adapted to receive the ramp voltage and the soft-start voltage, and
during operation, the PMOSFET gradually goes from an ON condition to an OFF condition as a consequence of the comparator output voltage as the ramp voltage increases toward the reference voltage.

5. The circuital arrangement according to claim 1, wherein the ramp generator comprises at least one of:
an RC ramp generator, wherein the RC ramp generator comprises at least one resistor coupled with at least one capacitor, and
a linear ramp generator, wherein the linear ramp comprises a fixed current source and a capacitor, the fixed current source being configured to feed a current to the capacitor.

6. The circuital arrangement according to claim 1, wherein:
the reference voltage generator is a bandgap voltage reference circuit, and
the reference voltage is a function of an output of the bandgap voltage reference circuit.

7. The circuital arrangement according to claim 1, further comprising a second switching element coupled with the ramp generator, wherein:
the second switching element is adapted to receive a control signal, the second switching element is in a first state when the control signal is at a first voltage and is in a second state when the control signal is at a second voltage, and
the ramp generator and the control loop are in operation when the second switching element is in the second state.

8. A DC-DC converter, comprising:
the circuital arrangement according to claim 1, wherein the circuital arrangement generates the soft-start voltage; and
a DC-DC conversion unit configured to generate a second voltage waveform based on the soft-start voltage,
wherein a voltage output of the DC-DC converter is an amplified version of the soft-start voltage.

9. The circuital arrangement according to claim 1, wherein the first input terminal of the comparator is a noninverting input terminal and the second input terminal of the comparator is an inverting input terminal.

10. The circuital arrangement according to claim 1, further comprising:
a PMOSFET comprising at least a first terminal and a second terminal,
wherein:
the first terminal of the PMOSFET is tied to the ramp generator,
the second terminal of the PMOSFET is tied to the second terminal of the first switching element,
the first terminal of the PMOSFET is adapted to receive the ramp voltage and the second terminal of the PMOSFET is adapted to receive the soft-start voltage, and
during operation, PMOSFET gradually goes from an ON condition to an OFF condition as a consequence of the comparator output voltage as the ramp voltage increases toward the reference voltage.

11. The circuital arrangement according to claim 7, wherein the second switching element is turned on in the first state and turned off in the second state.

12. A method of increasing a soft-start voltage from a first voltage to a second voltage, the second voltage being substantially equal in value to a reference voltage, the method comprising:
providing the circuital arrangement according to claim 7;
applying a control signal to the second switching element of the circuital arrangement such that the ramp generator and the control loop are in operation; and
increasing the soft-start voltage from the first voltage to the second voltage by operating the ramp generator and the control loop.

13. The DC-DC converter according to claim 8, wherein the second voltage waveform is a square wave, the DC-DC converter further comprising:
reactive and resistive elements coupled with the DC-DC conversion unit and configured to generate the voltage output of the DC-DC converter from the second voltage waveform.

14. The DC-DC converter according to claim 8, further comprising:
a transconductance amplifier coupled with the control loop of the circuital arrangement and adapted to receive the reference voltage and a feedback voltage,
wherein:
the feedback voltage is a function of the voltage output from the DC-DC converter, and
a current output from the DC-DC converter is based on a voltage output from the transconductance amplifier.

15. A method of increasing a soft-start voltage from a first voltage to a second voltage, the second voltage being substantially equal in value to a reference voltage, wherein the reference voltage is adapted to be generated via a reference voltage generator, the method comprising:

providing a control loop, wherein the control loop comprises a comparator comprising at least a first input terminal, a second input terminal, and a first output terminal, and a first switching element comprising at least a first terminal and a second terminal;

applying the reference voltage to the first input terminal of the comparator and to the second terminal of the first switching element;

generating a ramp voltage via a ramp generator wherein, during operation of the ramp generator, the ramp voltage starts from the first voltage and increases in magnitude over time to a voltage higher than the reference voltage;

generating a comparator output voltage at the first output terminal of the comparator by applying the ramp voltage to the second input terminal of the comparator;

applying the comparator output voltage to the first terminal of the first switching element;

obtaining the first voltage as the soft-start voltage at the second terminal of the switching element in correspondence of a current flow from the reference voltage generator through the switching element;

gradually decreasing the current flow by gradually setting the first switching element from an ON condition to an OFF condition as a consequence of increasing of the ramp voltage toward the reference voltage;

increasing the soft-start voltage toward the second voltage when the ramp voltage is less than the reference voltage; and retaining the soft-start voltage at the second voltage when the ramp voltage is greater than the reference voltage causing stopping of the current flow, thus increasing the soft-start voltage from the first voltage to the second voltage.

16. The method according to claim 15, wherein:
the soft-start voltage follows the ramp voltage when the ramp voltage is less than the reference voltage, and
the soft-start voltage follows the second voltage when the ramp voltage is greater than the reference voltage.

17. The method according to claim 15, wherein:
the soft-start voltage is an output of a soft-start circuit,
the reference voltage generator is adapted to generate the reference voltage when not coupled to the soft-start circuit, and
the generating of the ramp voltage, generating of the comparator output voltage, increasing of the soft-start voltage, and retaining of the soft-start voltage is performed during operation of the soft-start circuit.

18. The method according to claim 15, wherein:
the ramp generator comprises a resistor and a capacitor;
the resistor and the capacitor are coupled with the comparator; and
the generating of the ramp voltage comprises:
applying a source voltage to the ramp generator, wherein the source voltage is coupled to a first end of the resistor;
generating a current through the resistor based on a voltage difference between the source voltage and voltage at a second end of the resistor; and
generating the ramp voltage based on the current across the resistor, wherein the ramp voltage appears across the capacitor.

19. The method according to claim 17, wherein:
the first switching element is a field effect transistor, and
during operation of the soft-start circuit, the first switching element is outside of subthreshold mode when the ramp voltage is not greater than the reference voltage and is in subthreshold mode when the ramp voltage is greater than the reference voltage.

20. The method according to claim 17, further comprising:
providing a PMOSFET coupled with the first switching arrangement and the comparator on one end and the ramp generator on another end,
wherein:
the PMOSFET is adapted to receive the ramp voltage and the soft-start voltage, and
during operation of the soft-start circuit, the PMOSFET gradually goes from an ON condition to an OFF condition as a consequence of the comparator output voltage as the ramp voltage increases toward the reference voltage.

21. The method according to claim 17, further comprising:
providing a PMOSFET, wherein the PMOSFET comprises at least a first terminal and a second terminal;
applying the ramp voltage to the first terminal of the PMOSFET; and
applying the soft-start voltage to the second terminal of the PMOSFET,
wherein, during operation of the soft-start circuit, PMOSFET gradually goes from an ON condition to an OFF condition as a consequence of the comparator output voltage as the ramp voltage increases toward the reference voltage.

* * * * *